No. 697,749. Patented Apr. 15, 1902.
W. B. POTTER.
CONTROLLING DEVICE FOR ELECTRIC MOTORS.
(Application filed Aug. 29, 1898.)
(No Model.) 2 Sheets—Sheet 1.
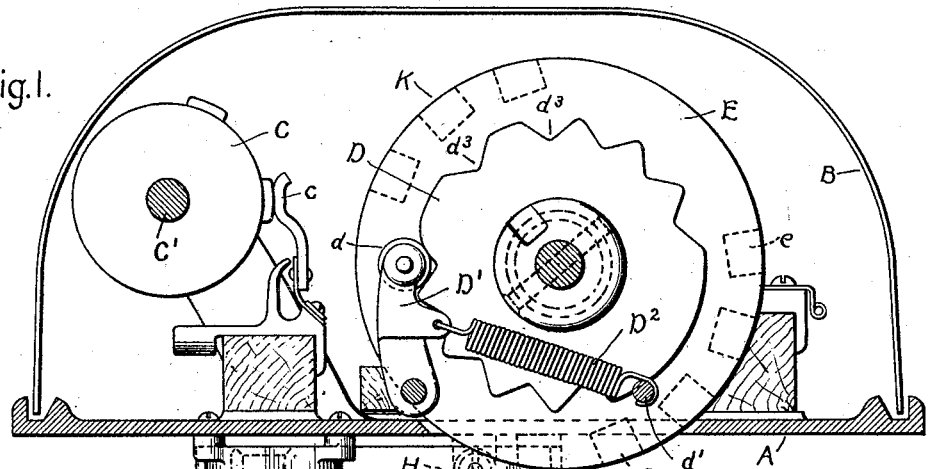
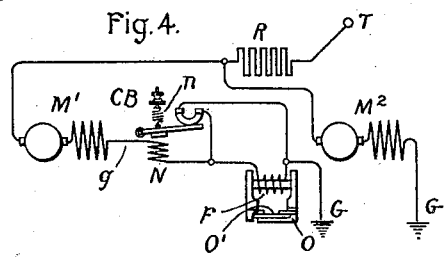
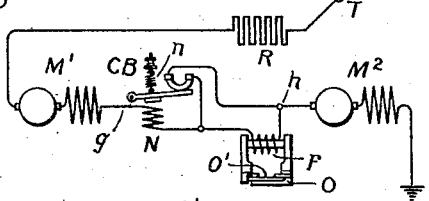
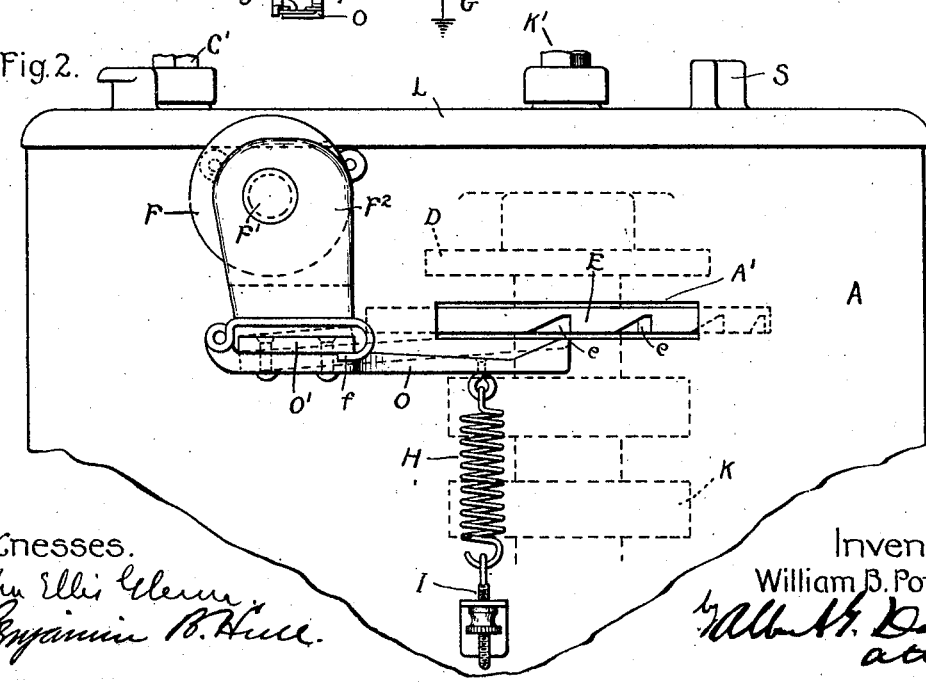
Witnesses. Inventor.
William B. Potter.

No. 697,749.
Patented Apr. 15, 1902.
W. B. POTTER.
CONTROLLING DEVICE FOR ELECTRIC MOTORS.
(Application filed Aug. 29, 1898.)
(No Model.)
2 Sheets—Sheet 2.
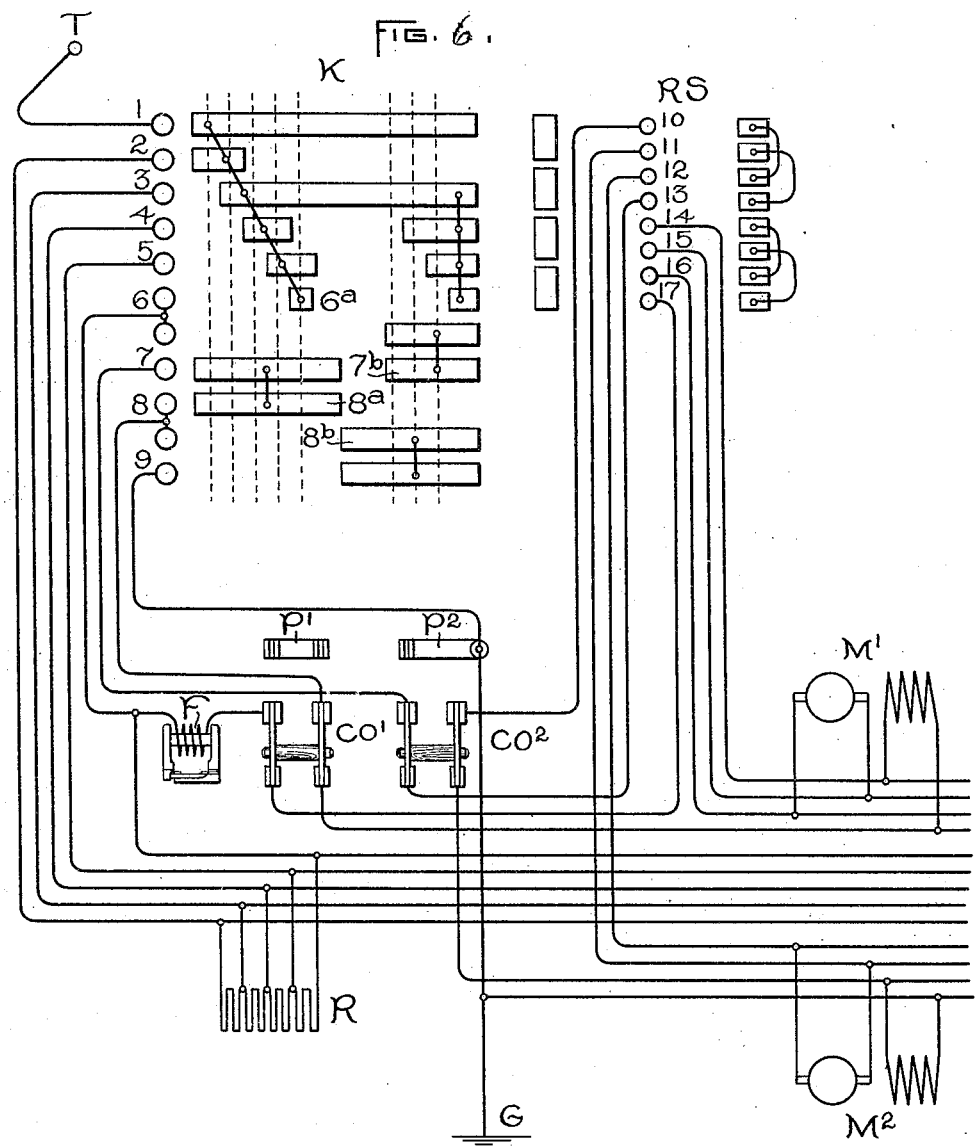
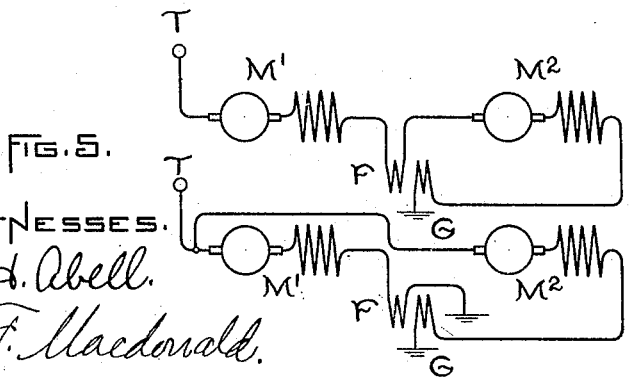

UNITED STATES PATENT OFFICE.

WILLIAM B. POTTER, OF SCHENECTADY, NEW YORK, ASSIGNOR TO THE GENERAL ELECTRIC COMPANY, A CORPORATION OF NEW YORK.

CONTROLLING DEVICE FOR ELECTRIC MOTORS.

SPECIFICATION forming part of Letters Patent No. 697,749, dated April 15, 1902.

Application filed August 29, 1898. Serial No. 689,746. (No model.)

*To all whom it may concern:*

Be it known that I, WILLIAM B. POTTER, a citizen of the United States, residing at Schenectady, in the county of Schenectady, State of New York, have invented certain new and useful Improvements in Controlling Devices for Electric Motors, (Case No. 781,) of which the following is a specification.

My invention relates to controlling devices for electric motors, and has for its object to provide a current-limiting device for apparatus of this kind by which the manipulation of the controller to increase current flow will be prevented at such times as the motors are already taking as much current as is proper for them to carry. The arrangement is such that although the current cannot be turned on to the motors faster than is desired, yet the limiting device has no effect on the backward movement of the handle.

To carry out the purposes of my invention, I employ in one of the motor-leads a current-measuring coil, preferably the coil of an electromagnet, and an armature within the influence of the coil, the motion of the latter being utilized to check the rotation of the controller. Its action may be direct or indirect. The passage of current through it may be constant, as when it is included directly in circuit with the motor, or it may be so arranged (and I prefer to have it so) that only when the current rises to a predetermined maximum will it pass in its entirety through the coil of the electromagnet. In this way I get a distinct and positive response in the automatic device. The preferred means of carrying out this part of the invention is to place a circuit-breaker in shunt to the coil, so arranged that only when the current rises to such a degree as to open the circuit-breaker does the entire current pass through the coil, the resistance of the circuits being adjusted to effect this.

The invention also comprises means for adjusting the effect of the coil of the current-limiting device to the current flow in the motors, so that where these are operated by the series-parallel system now in common use the current-limiting device will act at the proper point whether the motors be in series or in parallel, it being well known that the total flow of current in the circuit between trolley and ground is approximately twice as great in one case as in the other. This part of the invention I utilize by dividing the coil into a number of parts corresponding to the number of motors and so arranging the connections that these parts will be series paralleled, as the motors are.

The accompanying drawings show an embodiment of the invention.

Figure 1 is a plan, partly in section and with the cover removed, of a controlling device equipped with the invention, Fig. 2 being a rear elevation of parts of the device, Figs. 3, 4, and 5 are diagrams of circuits, and Fig. 6 is a diagram of the circuits of a controlling device having the invention applied thereto and with cut-out switches of a form adapted to its exercise.

In Fig. 1, A is the back of the controller. B is its case. C is the reversing-switch, in which $c$ is one of the brushes. K is the controlling-switch cylinder, the contacts of which may effect any desired change of connections for regulating the motors, although in practice the series-parallel form of controller is preferred. It is provided with a disk D, having notches $d^3$, in which as the controller is turned the roller $d$ of the pawl D' may drop. The pawl is attracted by the spring D², one end of which is secured to the pin $d'$, projecting downward from the cap-plate of the controller. This is a well-known step-by-step device used in all sorts of controllers. To the controller-cylinder the disk E is fixed, (seen best in Fig. 2,) having notches $e$ of such shape that the controller may be rotated in one direction whether the pawl corresponding to the notches is in them or not. With these notches the pawl O engages when in its upper position in Fig. 2. The pawl is retracted by the spring H, the tension of which is adjusted by the adjusting-screw I, so that the current limit is changed as desired. The pawl is attached to armature O' of an electromagnet, of which F is the coil, F' the core, and F² one of the pole-pieces. A stop $f$ prevents the armature O' from increasing its air-gap too much.

Fig. 2 shows the same parts similarly lettered, except that the cap L of the controller is shown in place. K' is the shaft of the controller, C' of the reversing-switch, and S a stop for the controller-handle. The disk E in this figure is shown passing through the back of the controller in the slot A'; but the whole device may, if desired, be arranged within the case without departing from my invention.

In Figs. 3 and 4 I show the arrangement outlined in the statement of invention, by which the current is caused to pass through the coil F only when the current exceeds the predetermined amount at which the stop should act.

While in practice a part of the current always passes in the coil with the connections illustrated, it is not sufficient to actuate the armature, and the main volume of current passes through the circuit-breaker CB. The series coil N of the circuit-breaker is set by the spring $n$ to trip its armature at just that point at which it is desired to actuate the armature O. As the current increases in the circuit it reaches this point, the circuit-breaker opens, and the entire current is then suddenly passed through the coil F, moving the armature O quickly and positively.

In the practical operation of a device of the class described it is of great importance to preserve the effect of the coil proportionate to the current in the motor or motors. It is well known, for instance, that in the series-parallel combination the current in the circuit between the trolley and ground is in the parallel position double that flowing when the motors are in series. It is manifest that the current-limiting device, if connected in this circuit, would ordinarily continue to limit the current flow in the parallel position below that requisite for the proper operation of the motors, or if connected so as to be effective in the parallel position would allow too much current to flow in series. In my invention I so arrange the device that this difficulty is obviated. Several different methods may be adopted, two only of which I will describe; but I of course intend to cover by the claims any arrangement of the device which will permit its effect to be automatically varied in accordance with a desired change of current-flow in the motors.

The first arrangement for effecting the described purpose is that illustrated in Figs. 3 and 4. Here the coil F is shown in series, with the coil of the circuit-breaker N between, so that the circuit-breaker coil carries the entire current when the motors are in series and half the doubled current when the motors are in parallel and never operates until a predetermined current flows through either motor, thus furnishing a means for checking the movement of said controller whenever a predetermined current flows through the motors during any of their various relations with respect to each other. In practice this will be an efficacious way of effecting the adjustment spoken of, for it is manifest that practically the current-flow in the two motors will be identical. In changing the motor connections from series to parallel it is of course necessary to break the circuit at some point between the motors, thus leaving the motor M' connected at one end to the trolley and the motor M² connected at one end to ground and both motors entirely disconnected at their other terminals. Then in order to complete the parallel connection that side of the break which is connected to motor No. 1 must be connected to ground, while the other side, leading to the motor No. 2, must be connected to trolley. With the arrangement shown in Fig. 3 the circuit between the motors may be broken, in changing from series to parallel, either at the point $g$ or at the point $h$. In the former case the circuit-breaker and the coil F will be left in the circuit of the motor M² and in the latter case in the circuit of the motor M', so that at whatever point the circuit is broken the coil F and the circuit-breaker will in the parallel connection carry only one-half of the total current supplied to the motors. In Fig. 4 I have illustrated the parallel connections of the motors, with the circuit-breaker and the coil F left in circuit with the motor M'. Another way of accomplishing the same results is shown in Fig. 5. Here the coil F is divided into two parts, and each of the parts is put into circuit with one of the two motors. If a coil can be maintained in series with each motor during both the series and parallel relations of the motors, clearly the electromagnet of which each coil forms a part will be actuated whenever a certain current flows through any motor in either series or parallel relation. In the first of the diagrams in the figure the two motors are shown in series. In this arrangement the two coils are also in series. In the second, where the motors are in parallel, the coils are also shown in parallel, but each in series with its own motor, and of course the effect of each corresponds to the current-flow in the particular motor with which it is connected. Where a number of motors are employed, this is the best arrangement. If the flow of current in the respective motors should be different, the effect of the different coils would still preserve a general relation to the average current requirements of all the motors. A still further difficulty arises with the ordinary series-parallel controller, which I aim to obviate. With the coil in series with the motors, as just indicated with reference to Fig. 3, if the cut-out switches be operated in the ordinary way some arrangement must be made by which the coil will still be left in circuit with whichever motor may happen to be active; otherwise, if the coil, for instance, were in series with motor No. 1 and that motor should be cut out there would be no current in the coil and the device would be inoperative. I have therefore arranged the connections of the ordinary cut-out switches in the controller so that whichever motor is cut out the coil F will still be left in series with the remaining motor or motors. To render this more clear, I show in Fig. 6 a diagram of a series-parallel controlling device of well-known form with the current-limiting device of my invention applied thereto and with proper connections for the cut-out switches. The controlling-cylinder is shown developed in plane, as is also the reversing-switch RS. The fixed contacts are numbered on the controller from "1" to "9" and on the reversing-switch from "10" to "17." The cut-out switches are lettered CO' CO². These switches have back contacts P' P². P' is simply a bridging-contact, while P² connects one blade of the cut-out switch directly to ground, the other being open-circuited.

The series position of the motors with the resistance R cut out may be traced as follows: from the trolley T to the contact 1, then by the contact-plates of the controller-cylinder and the cross connection to contact 6ª, through the coil F, across one blade of the switch CO', contact 17 on the reversing-switch, contact 16, through the armature of the motor M', back to the reversing-switch, through the field of motor M', across the other blade of the switch CO', to contact 8 on the controller, contact 7, across switch CO², to the reversing switch at contact 13, contact 12, and so through the armature of the motor M², back to the reversing-switch, through the field of M² to ground.

When contact 8 bridges the contacts 8ª and 8ᵇ, a shunt is thrown around the second motor. The circuit of the latter is then opened and is reëstablished when contact 7 touches contact 7ᵇ, so that the two motors are connected in parallel. This is a well-known type of controller. Assume now that the switch CO' is thrown so as to connect its blades by the back contact P'. This will cut out motor M'. The circuit is then from the trolley to contact 6, through the coil F, the first blade of the switch CO', by back contact P' to the other blade of CO', then back to the controller at contact 8, contact 7, through CO² to the reversing-switch at contact 13, then to contact 12, through the armature of motor M² back to the reversing-switch, through the field of motor M² to ground, the coil F being thus still maintained in circuit. With the switch CO² thrown the motor M² is cut out, the circuit being from contact 6ª through the coil F, the first blade of switch CO' in its illustrated position, contact 17 on the reversing-switch, contact 16, through the armature of motor M', back to the reversing-switch, through the field of motor M', across the second blade of switch CO', to contact 8 on the controller, contact 7, to the first blade of the switch CO², and by the back contact P² direct to ground. It will be observed that the coil F is thus in circuit whichever motor may happen to be cut out.

The operation of the invention is as follows: With the connections shown in Fig. 3 as the controller is rotated from its off position the current flows through the resistance R to the first motor M', then through the coil N of the circuit-breaker and by the shunt around the coil F, thence through the motor M² to ground at G. Owing to the low resistance of the shunt most of the current flows through it, and only a small current passes through the coil F, and therefore its armature is not attracted sufficiently to overcome the spring H. (See Fig. 2.) If the controller be so rotated that the resistance is cut out too rapidly, the current rises in coil N, so that the armature of the circuit-breaker is drawn down, opening the shunt and sending the entire current through the coil F, which then attracts armature O' and the pawl O, attached to it. However the coil F is connected when its armature is attracted, the pawl enters the next one of the notches e as the disk E rotates, arresting the forward movement of the controller; but this has no effect on the backward movement of the handle, the bevel of the notches e being such that the pawl O is forced out of them by the rotation backward of the disk E. When the current has so fallen that the spring n of the circuit-breaker overcomes the attraction of the coil N, the contacts are closed and the circuit is established as before.

From the description of the operation as outlined in Fig. 3 the operation of the device will be apparent when connected according to any of the modifications shown, as in Fig. 4 or Fig. 5, or if connected without a circuit-breaker.

I am the first, so far as I know, to so arrange and connect the winding of the current-limiting device that the current will pass in its entirety through the same only when it rises to a predetermined maximum, or to proportion the action of the current-limiting device to the requirements of the motors by series paralleling the coils of an electromagnet in accordance with the relative connections of the different motors, or to arrange cut-out switches which do not interfere with the current-limiting device. While electric motors are mentioned in the claims, nevertheless I consider that the invention may be used with any translating devices.

What I claim as new, and desire to secure by Letters Patent of the United States, is—

1. A current-limiting device comprising an electromagnet in circuit with the apparatus to be protected, its coil carrying only a small part of the current during normal working, a current-regulator, a stop for the regulator controlled by the electromagnet, and means for throwing the entire current through the magnet-coil when the current rises to a determinate maximum.

2. The combination with electric motors, of a movable controller, means for locking said controller from movement, a magnet controlling said means, a shunt around the magnet-coil, and means for opening the shunt when the current in the motor-circuit rises to a given value.

3. In combination, motors and a controller, a ratchet upon the controller, and a pawl adapted to engage with said ratchet to check the movement of said controller and controlled by an electromagnet in the main circuit; with a shunt-circuit around the electromagnet controlled by a circuit-breaker the coil of which is in the main circuit.

4. The combination with electric motors, of a controller therefor, and means for checking the movement of said controller whenever a predetermined current flows through any of the motors while it is in any relation with respect to the other motors.

5. The combination with two or more electrically-connected translating devices, of a movable controller therefor, a locking device for said controller, an electromagnet for actuating said locking device, and a circuit-breaker adapted to cause the entire working current to pass through said electromagnet when said current reaches a predetermined maximum.

6. A plurality of motors, cut-out switches, and a current-limiting device; in combination with connections arranged to leave the current-limiting device always in series with at least one active motor.

7. A plurality of electric motors, a current-limiting device having coils in series with each motor, a series-parallel controller, and connections such that as the motors are thrown into series or parallel, the coils upon the current-limiting device are connected in circuit in a similar relation.

8. The combination of a number of electric motors with a motor-controller, a cut-out switch for each motor, and a current-limiting device consisting of an electromagnet and a stop for the controller; the cut-outs being so connected that as any one of them is thrown, it shifts the coil of the electromagnet to the circuit of the other motor.

9. The combination with electric motors, of a current-limiting device for said motors, an electromagnetic actuator for said limiting device adapted to be connected in circuit with said motors, and means whereby said electromagnet shall be operative while current flows through any motor.

10. The combination with electric motors, of a current-limiting device therefor, an electromagnetic actuator for said limiting device adapted to be connected in series with any motor, and means for simultaneously cutting out that motor and connecting the electromagnet in another motor-circuit.

11. The combination with electric translating devices of a current-limiting device for said devices, an electromagnet whose coil is in circuit with said translating devices, for actuating said limiting device, and cut-outs for said translating devices adapted to leave the magnet-coil in circuit with a translating device still in circuit.

12. The combination with electric motors, of a controller therefor, means for checking the movement of said controller, an electromagnet in circuit with the motors for actuating said means, and cut-outs adapted to connect said magnet in another motor-circuit when the motor-circuit in which it is connected is opened.

13. The combination with electric motors, of a current-limiting device therefor, an electromagnetic actuator for said limiting device, having its solenoid composed of two or more coils, each of which is adapted to remain connected in series with a motor in all relations of said motors with respect to each other.

14. The combination with a rotatable motor-controlling switch, of a ratchet-disk secured thereto, a pawl for said disk, an electromagnetic actuator for said pawl, and means for causing sufficient of the working current to flow through said electromagnet to actuate the same, only when the working current reaches a predetermined amount.

15. The combination with electric motors of a controller, a locking device for said controller, an electromagnetic actuator for said device, and means for causing sufficient working current to flow through said electromagnet to actuate the same only when the working current reaches a predetermined maximum.

16. The combination with electric motors, of a series-parallel controller therefor, means for checking the movement of said controller, an electromagnetic actuator for said means, having its solenoid composed of separate coils each of which is in circuit with a motor, and all of which have their relations changed by the controller with those of the motors.

17. The combination with translating devices, of a current-limiting device therefor, an electromagnetic actuator for said limiting device, having its solenoid composed of separate coils, each coil connected in series with one of the translating devices.

18. The combination with electric motors, of a controller therefor, means for checking the movement of said controller, an electromagnet in a motor-circuit for actuating said means, and a circuit-breaker for sending an operative current through the electromagnet when the motor-current reaches a predetermined amount.

19. The combination with electric motors of a controller therefor, means for checking the movement of said controller, an electromagnetic actuator having its coil in series with one motor, a low-resistance shunt around the coil of said actuator and a circuit-breaker controlling the shunt-circuit, having its coil in series with the magnet-coil and adapted to open the low-resistance shunt when the current flowing through the motor reaches a predetermined amount.

20. The combination with a current-limiting device, of an electromagnet for actuating said device, and means for causing the working current to flow through the electromagnet when the supply-current reaches a predetermined maximum.

21. The combination with a current-limiting device, of an electromagnet for actuating said device, and a circuit-breaker adapted to cause said electromagnet to be actuated when the supply of current reaches a predetermined maximum.

22. The combination with a movable controller for translating devices, of a locking device therefor, an electromagnet for actuating said device, means for actuating said electromagnet, and means for determining in advance the point at which the electromagnet shall be actuated.

23. The combination with electric motors, of a controller therefor, and means for checking the movement of said controller whenever a predetermined current flows through any one of said motors.

24. The combination with electric motors, of a series-parallel controller therefor, and means for checking the movement of said controller during its series or parallel position when a predetermined current flows through any one of said motors.

25. The combination with electric motors, of a controller therefor, means for checking the movement of said controller, an electromagnet for actuating said means, and means for diverting from a normal path to a motor a current for operating said electromagnet.

26. In combination, in a circuit containing a plurality of translating devices, means for connecting said devices either in series or in parallel, means for controlling the flow of current in said circuit, and means controlled by the current flowing in each of said devices for limiting the movement of said current-controlling means.

In witness whereof I have hereunto set my hand this 26th day of August, 1898.

WILLIAM B. POTTER.

Witnesses:
A. F. MACDONALD,
A. H. ABELL.